United States Patent
Dudar

(10) Patent No.: US 10,436,152 B2
(45) Date of Patent: Oct. 8, 2019

(54) VEHICLE REPOSITIONING FOR EVAPORATIVE EMISSION REDUCTION

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 314 days.

(21) Appl. No.: 15/425,054

(22) Filed: Feb. 6, 2017

(65) Prior Publication Data
US 2018/0224861 A1 Aug. 9, 2018

(51) Int. Cl.
*F02M 25/08* (2006.01)
*B60W 30/00* (2006.01)
*G05D 1/02* (2006.01)

(52) U.S. Cl.
CPC ........ *F02M 25/0836* (2013.01); *B60W 30/00* (2013.01); *F02M 25/089* (2013.01); *F02M 25/0854* (2013.01); *G05D 1/0246* (2013.01); *G05D 2201/0213* (2013.01)

(58) Field of Classification Search
CPC . G05D 1/0219; G05D 1/0088; F02M 25/0836
See application file for complete search history.

(56) References Cited

U.S. PATENT DOCUMENTS

| | | | |
|---|---|---|---|
| 5,850,819 A | 12/1998 | Kunimitsu | |
| 8,330,591 B2 | 12/2012 | Ziehr | |
| 9,422,002 B2 | 8/2016 | Li et al. | |
| 2010/0254595 A1* | 10/2010 | Miyamoto | G06K 9/2036 382/159 |
| 2015/0360720 A1* | 12/2015 | Li | B62D 15/027 701/400 |

FOREIGN PATENT DOCUMENTS

| | | |
|---|---|---|
| DE | 102009022280 A1 | 1/2010 |
| DE | 102010054081 A1 | 6/2012 |
| DE | 102014211550 B3 | 3/2015 |
| DE | 102014001554 B4 | 7/2016 |
| JP | 2008275491 A | 11/2008 |
| JP | 4958107 B2 | 6/2012 |
| JP | 2016116357 A | 6/2016 |
| KR | 20100013575 A | 2/2010 |
| WO | 2015117633 A1 | 8/2015 |

OTHER PUBLICATIONS

Search Report from United Kingdom Intellectual Property Office dated Jul. 31, 2018 regarding GB Application No. GB1801698.0 (3 pages).

* cited by examiner

Primary Examiner — Calvin Cheung
(74) Attorney, Agent, or Firm — Frank A. MacKenzie; Bejin Bieneman PLC

(57) ABSTRACT

A vehicle includes an evaporative emission control system. A position of the vehicle is determined. A position of the sun relative to the vehicle is determined. Areas of shade within a predetermined range of the vehicle are identified. One of the areas of shade is selected as a target area. The vehicle is directed to the target area.

20 Claims, 8 Drawing Sheets

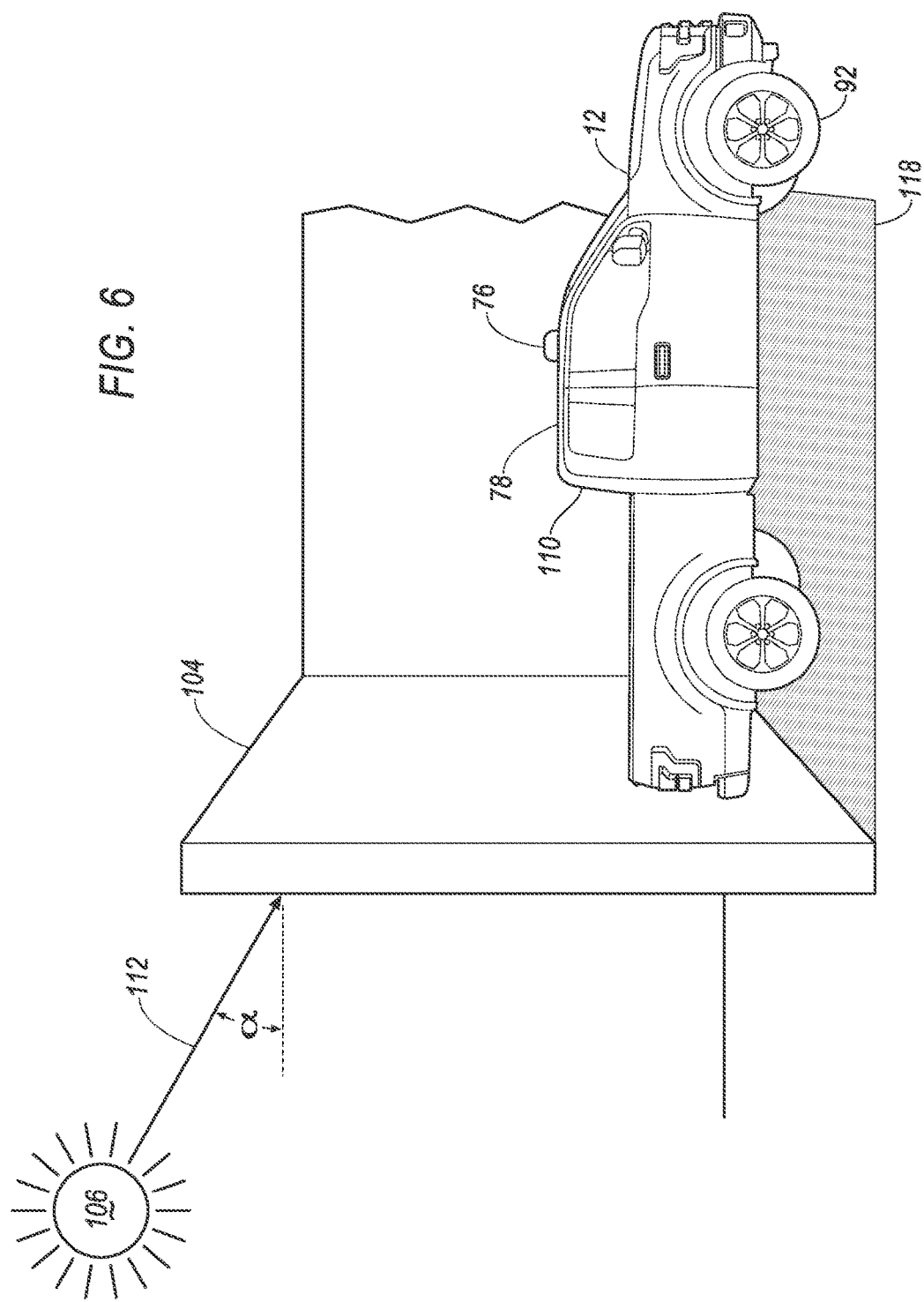

VEHICLE REPOSITIONING FOR EVAPORATIVE EMISSION REDUCTION

BACKGROUND

Motor vehicles, including autonomous motor vehicles, may carry hydrocarbon fluids, evaporative gases of which pose environmental hazards. When the vehicle is exposed to solar energy loads, evaporation rates of such gases increase. Vehicles may carry on-board absorption devices that capture such evaporative gases. However, when vehicles are subjected to direct sunlight, the fuel of the vehicles may become elevated in temperature, and the capability of the on-board absorptions devices to contain such gases may be exceeded.

BRIEF DESCRIPTION OF THE DRAWINGS

FIG. 6 is the example vehicle in the example position C of FIG. 3.

DETAILED DESCRIPTION

Introduction

A vehicle includes an evaporative emission control system. A position of the vehicle is determined. A position of the sun relative to the vehicle is determined. Areas of shade within a predetermined range of the vehicle are identified. One of the areas of shade is selected as a target area. The vehicle is directed to the target area. As used herein, the position of the vehicle means a combination of a geographic location of the vehicle as may be established by global positioning system ("GPS") coordinates, and the orientation, e.g., east, west, north, south, of the vehicle as may be established by a compass.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a driver seat, facing a dashboard. In the Figures, like numerals indicate like parts throughout the several views.

Exemplary System Elements

Figure 1:
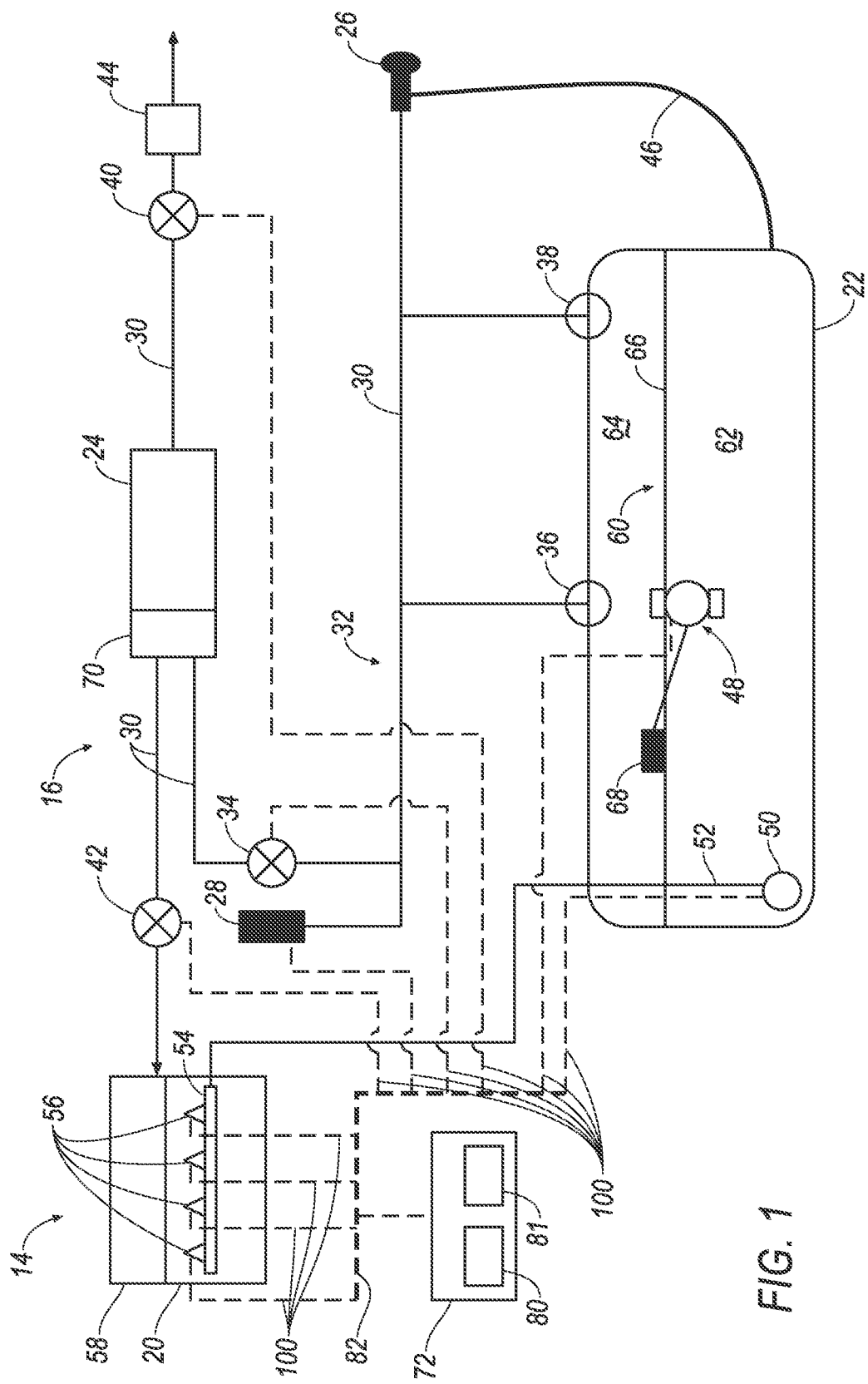
FIG. 1 is a schematic diagram of an example fuel system incorporating an example evaporative emissions control system for use in a vehicle.
Figure 2:
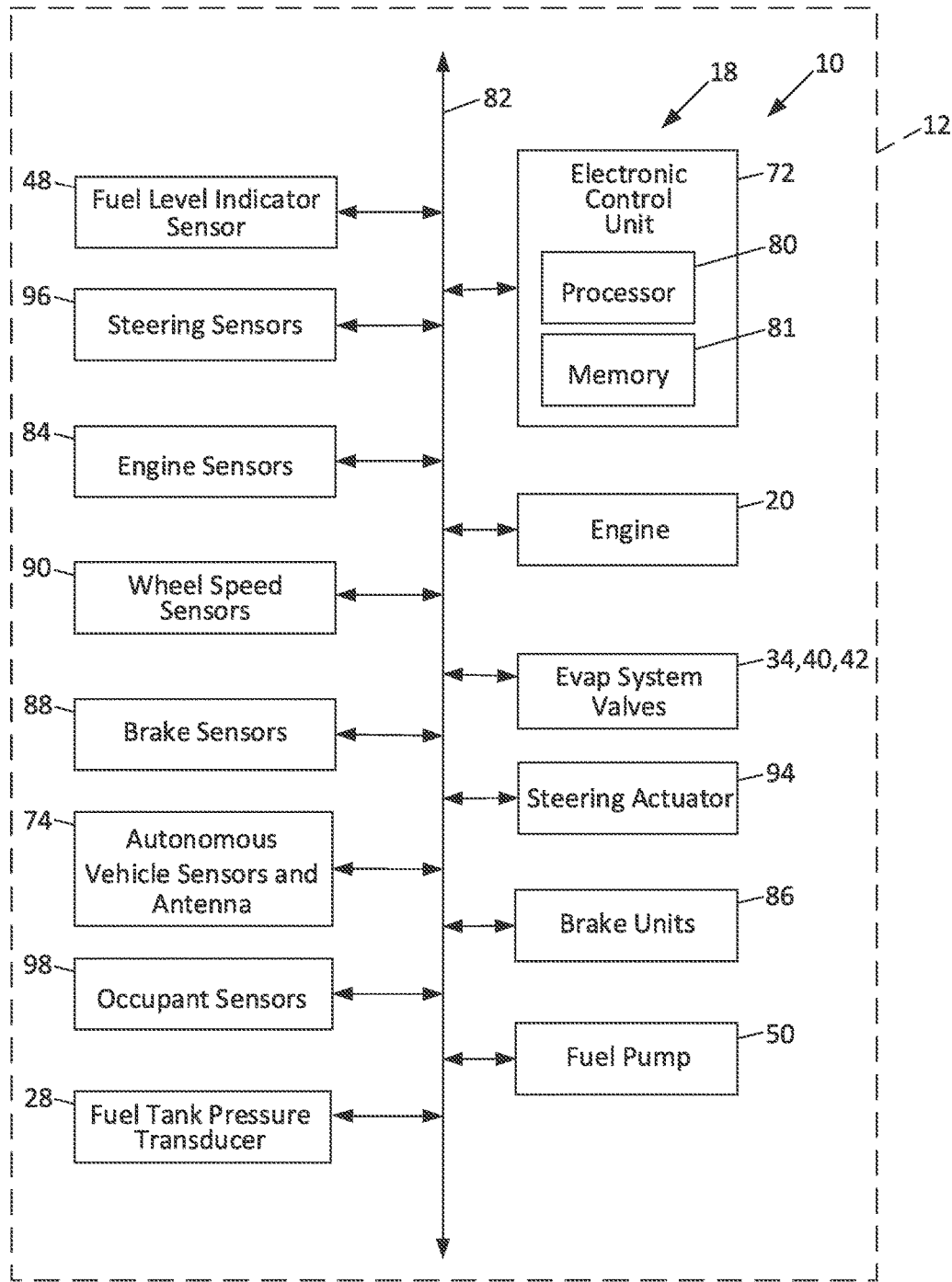
FIG. 2 is a block diagram of an example vehicle incorporating the system of FIG. 1.

With reference to FIGS. 1 and 2, an example vehicle solar evaporative emissions optimization system 10 for an example vehicle 12 includes a fuel system 14 which in turn includes an evaporative emissions system 16. For the purpose of this description, the fuel system is inclusive of the evaporative emissions system 16. The optimization system 10 may cooperate with a pilot system 18 for autonomously repositioning (i.e., without human intervention or control of the repositioning) the vehicle 12.

The fuel system 14 and the emissions system 16 of FIG. 1 and of the below description are known, and are described herein to provide background and context for the description of the optimization system. The main distinction between the two is that the evaporative emissions system 16 is exclusive of the components are the fuel system 14 that are dedicated to delivering liquid fuel, e.g., gasoline, to an example internal combustion engine 20 of the vehicle 12.

Components of the evaporative emissions system include a fuel tank 22, a fuel vapor canister 24, a gas cap 26, a fuel tank pressure transducer 28, a plurality of vapor tubes 30 defining a fuel vapor manifold 32 used to communicate fuel vapors, a plurality of control valves 34, 36, 38, 40, 42 used to regulate the flow of air and vapors in the system 16, and a dust box 44, i.e., an air filter.

The fuel system 14 may additionally include a filler neck 46 between the gas cap 26 and the fuel tank 22, a fuel level indicator sensor 48, a fuel pump 50, a fuel line 52 connecting the pump 50 to a fuel rail 54 and fuel injectors 56 connected to the fuel rail 54 and connected to one of an intake manifold 58 and a combustion cylinder (not shown) of engine 20.

When there is liquid fuel 60 in the fuel tank 22, a volume of tank 22 is divided into a liquid fuel space 62 and a vapor space 64 disposed above an upper surface of the liquid fuel 60, i.e., the fuel level 66. As is known, the fuel level indicator sensor 48 may have a float element 68 that floats at or near the fuel level 66.

The vapor manifold 32 fluidly connects the fuel vapor canister 24 with the fuel tank 22 and the engine 20 and the atmosphere. The manifold 32 may also fluidly connect the pressure transducer 28 with the fuel tank 22.

A vapor bypass valve 34, which may be a normally open valve, may be disposed between the fuel tank 22 and the canister 24. A fill limit vent valve 36 is disposed at an upper surface of the fuel tank 22. A grade vent valve 38 is also disposed at an upper surface of the fuel tank 22.

A canister vent valve 40, typically open by default, i.e., open under normal operating conditions, is disposed between the dust box 44 and a vent side of the canister 24. A purge control valve 42, typically closed by default, is disposed between the intake manifold 58 and a purge side of the canister. The canister 24 may have a buffer chamber 70 on its purge side. Buffer chamber 70 may include a bed of charcoal. The charcoal removes the volatile chemical molecules from vapors entering canister 24 from fuel tank 22. In a typical power-off condition, valves 34 and 40 are open. Fuel vapor passing from fuel tank 22 into and through the canister 24 is scrubbed of the volatile chemical molecules by the charcoal before exiting filter 44.

The gas cap may include an integral pressure and vacuum relief valve. The relief valve prevents fuel vapors from escaping from the fuel system 14 during normal operating conditions. It also prevents the fuel tank 22 from being damaged by levels of pressure and vacuum greater than those established by the relief valves. Example relief magnitudes include 14 kPa (2 psi) for pressure relief, and 3.8 kPa (0.5 psi) for vacuum relief. When pressure is relieved, fuel vapor may be released to the canister 24 from the fuel tank 22.

System 10 also includes a computing device, e.g., an electronic control unit ("ECU") 72. Vehicle 12 may be an autonomous vehicle (as that term is defined below), having the pilot system 18 mentioned above. The pilot system 18 may include a plurality of sensors and a plurality of actuators, connected to the ECU 72 via a vehicle network 82.

The sensors of the pilot system 18 may include a plurality of vehicle situational awareness sensors or autonomous vehicle sensors ("AV sensors") 74. AV sensors 74 may include sensors mounted inside a vehicle passenger cabin, and may additionally be mounted outside of the vehicle in a protective shell 76 on a roof 78 of the vehicle or in a fascia of the vehicle. A preferred location may depend on the type of sensor. An identification of several exemplary types of sensors that may be used is provided below.

ECU 72 may be comprised of a single computing device, as shown in FIG. 2, or may alternatively be comprised of a plurality of computers (e.g., ECUs), including, for example, a powertrain computer, itself potentially comprising an engine computer and a transmission computer, an infotainment computer, a chassis systems computer, restraint system computer, a vehicle security computer, and so on. ECU 72 includes an electronic processor 80 and an associated memory 81. System 18 may further include a vehicle network 82 including one or more wired and/or wireless communications media such as an example system Control Area Network ("CAN") bus or a Local Interconnect Network ("LIN") and/or other communications interface. Network 82 provides a transmission media between and connecting elements of the optimization system 10 and the pilot system 18 including ECU 72 and components and ancillary systems including, by way of example, engine 20, engine sensors 84, a plurality of brake units 86, brake sensors 88, wheel speed sensors 90 associated with wheels 92, a steering actuator 94, steering sensors 96, occupant sensors 98, valves 34, 40, 42, pressure transducer 28, level indicator sensor 48, and/or vehicle situational awareness sensors 74.

Vehicle 12 includes four wheels 92, each of which may include a tire. Each of wheels 92 may be associated with one of the brake units 86. Wheel speed sensors 90 may be integrated into brake units 86. Steering actuator 94 and associated steering sensors 96 are incorporated into the vehicle 12 steering system. Engine 20 may, by way of example, be an internal combustion engine providing all propulsive power or may be in combination with an electric motor, i.e., a so-called hybrid powertrain. Engine 20 may or may not include or be coupled to a transmission providing torque and speed ratios. Engine 20 may be a single unit near a front of vehicle 12, or engine 20 may alternatively be located elsewhere in the vehicle 12.

Each of engine 20, brake units 86, fuel system valves 34, 40, 42 and steering actuator 94 are illustrated as connected directly to ECU 72 through network 82, but may alternatively or additionally be connected directly to ECU 72. FIG. 1 shows wires 100 making such connections, but the connections could alternatively be made wirelessly using Bluetooth or other signal transmission technologies. Each of engine 20, brake units 86, and steering actuator 94 may include a respective electronic controller that receives instructions from ECU 72.

The memory 81 of ECU 72 includes one or more forms of computer-readable media, and stores instructions executable by the processor 80 for performing various operations, including such operations as disclosed herein. Processor 80 may read and execute such instructions. ECU 72 includes programming to autonomously operate autonomous vehicle 12 in a fully autonomous mode.

For purposes of this disclosure, the term "autonomous vehicle" is used to refer to a vehicle operating in the fully autonomous mode. The fully autonomous mode is defined as one in which each of vehicle 12 propulsion (typically via a powertrain including engine 20 as defined herein), braking, and steering are controlled by ECU 72 under substantially all circumstances. In a semi-autonomous mode, one or two of these are controlled by the ECU 72, and in a non-autonomous mode, none of them are.

The memory 81 of ECU 72 also stores data. Data may include collected data that is collected from a variety of devices. In general, collected data may include any data from a map database, and any data that may be gathered by any data collection device including engine sensors 84, wheel speed sensors 90, steering sensors 96, occupant sensors 98, AV sensors 74, fuel level indicator sensor 48, fuel tank pressure transducer 28, and/or data computed from such data. Exemplary steering sensors 96 may include a rack position sensor and/or a lateral acceleration sensor. Exemplary AV sensors 74 may include vehicle context and position sensors and location sensors such as a radar sensor, a LIDAR sensor, a vision sensor (e.g., a camera), a GPS sensor, antennae and the like. Radar sensors may be used both for locating other objects, and for, by exploiting the Doppler effect, determining a relative velocity of such other objects. The foregoing examples are not intended to be limiting. Other types of data collection devices may be used to provide data to ECU 72. Data may also include calculated data calculated in ECU 72 from collected data and from other calculated data.

Figure 3:
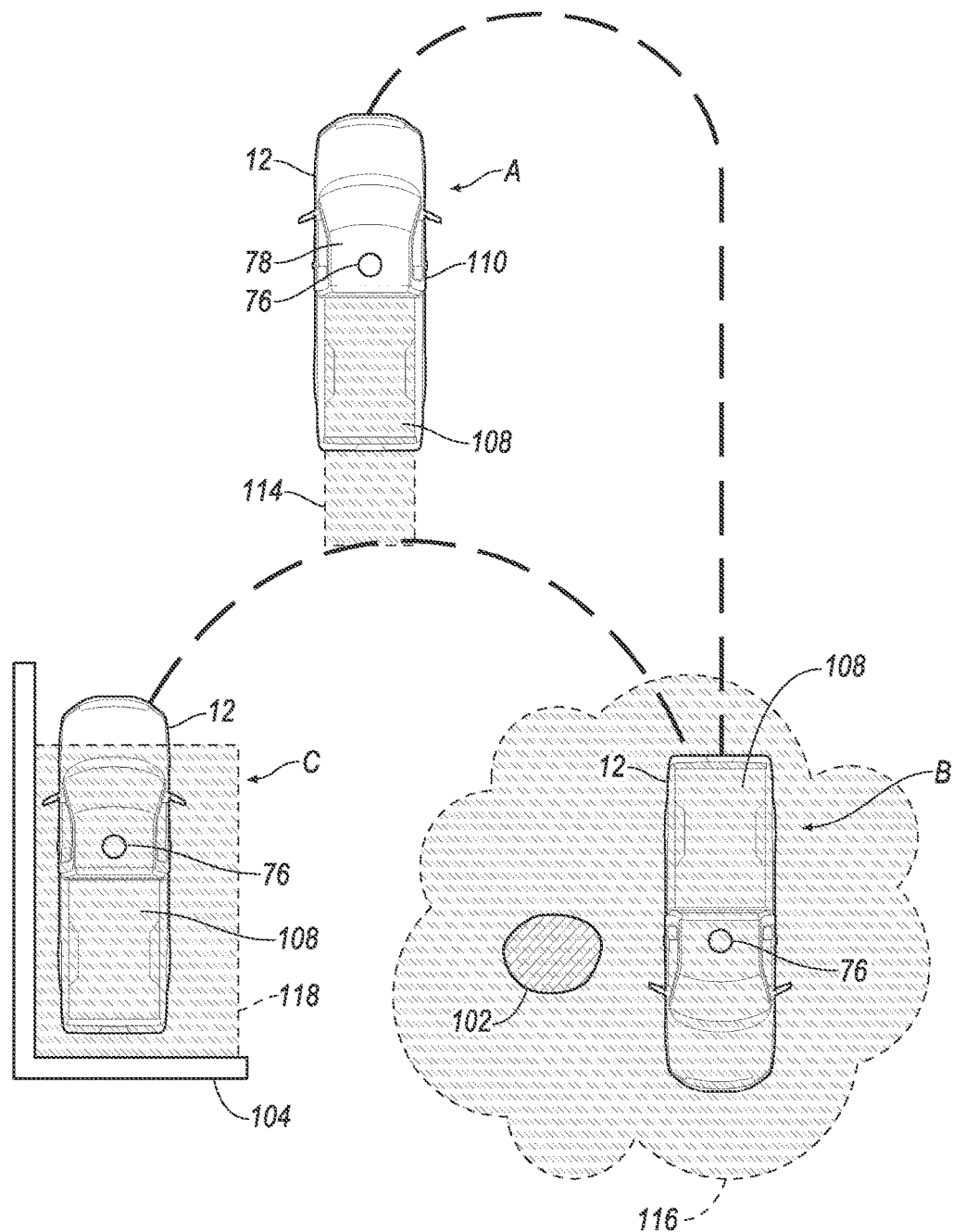
FIG. 3 is the vehicle of FIG. 2 in three example locations with each position providing an example shade benefit.
Figure 4:
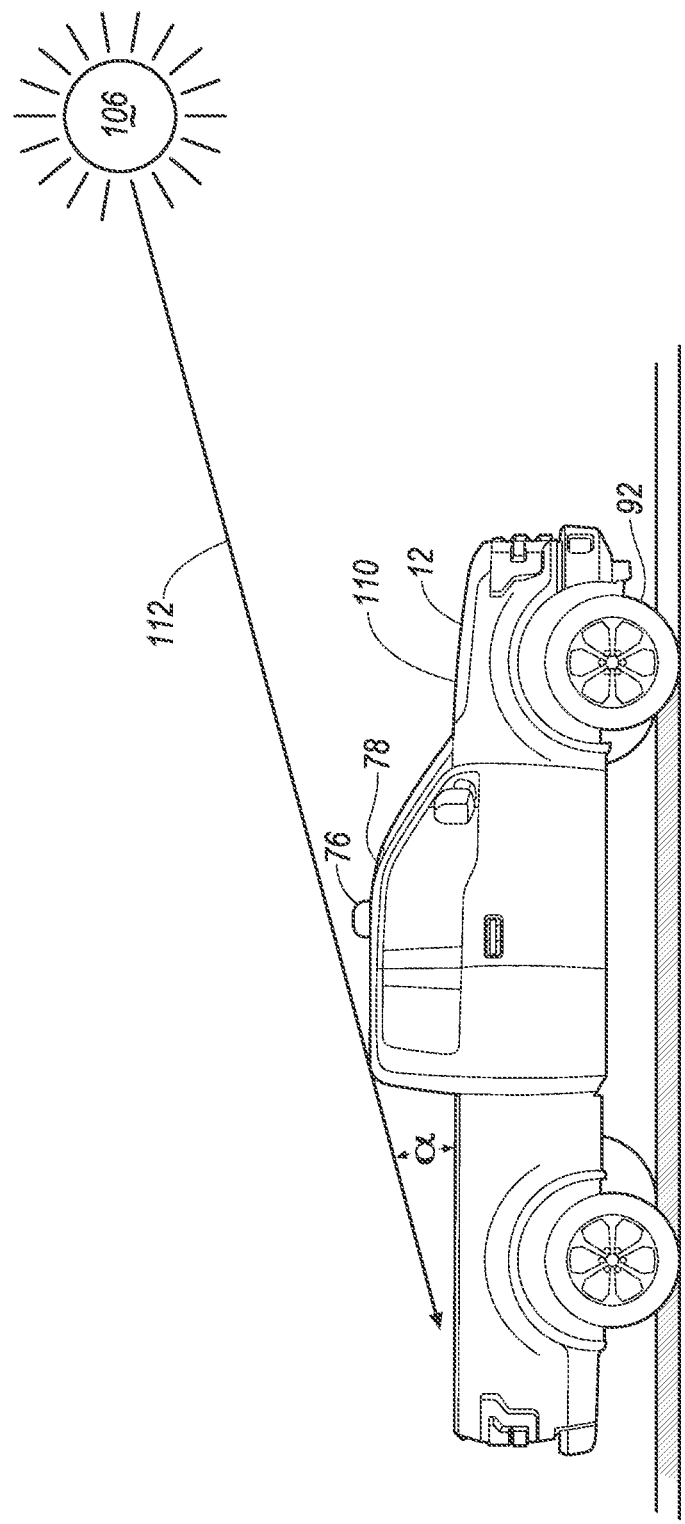
FIG. 4 is the example vehicle in the example position A of FIG. 3.
Figure 5:
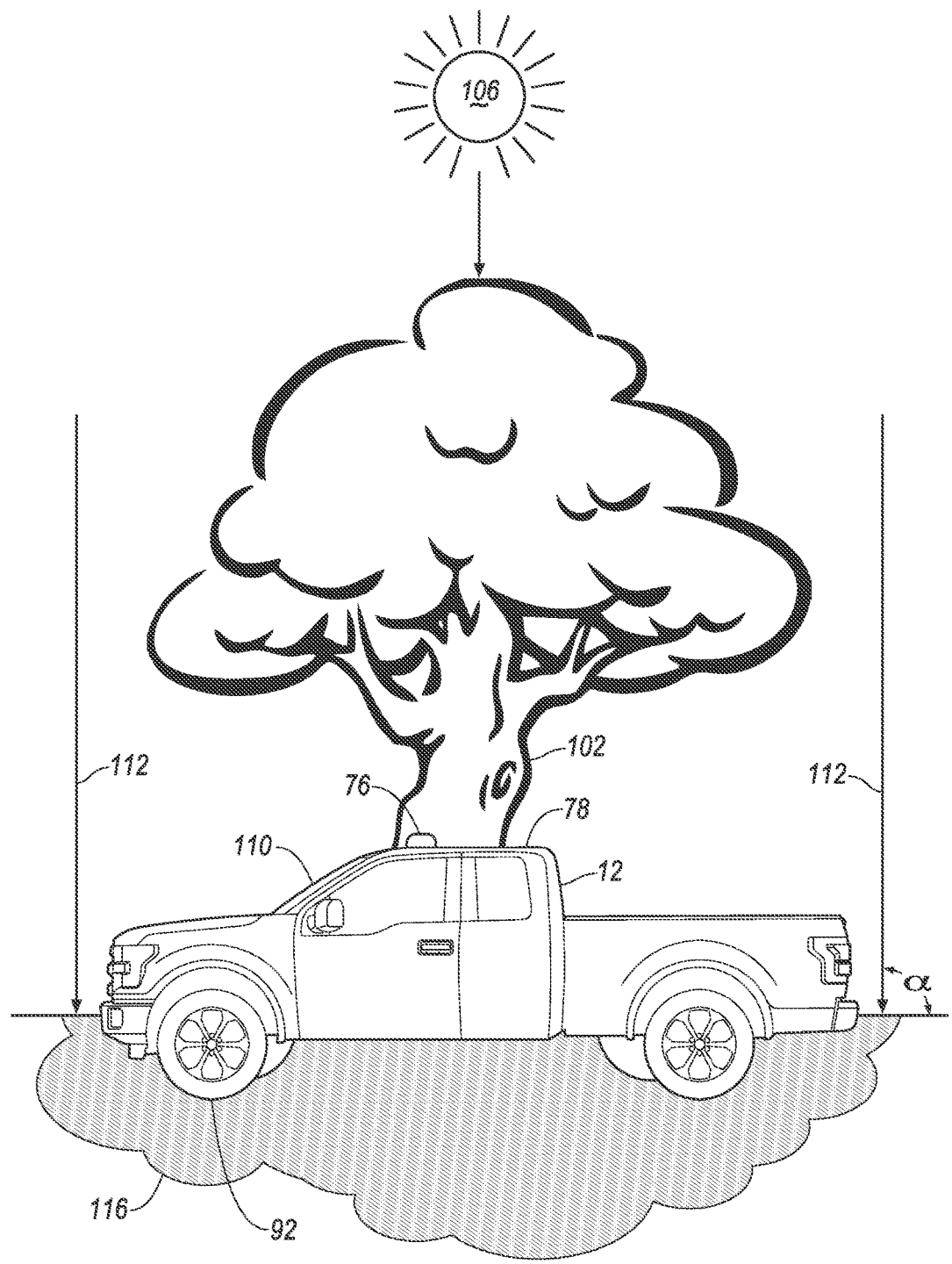
FIG. 5 is the example vehicle in the example position B of FIG. 3.

FIG. 3 illustrates the vehicle 12 in three example positions. The example positions, labeled A, B and C, are associated with distinct shade features. Shade features include structures that cast areas of shade, i.e., shadows, when impinged on by light rays of the sun. The example shade features illustrated in FIG. 3 and in FIGS. 4-6 may provide shade protection, i.e., a shadow sufficiently large to cover the part of the vehicle storing fuel, at different times of the day. As used herein, shade refers to shade from the light rays of the sun, and areas of shade refers to the location and size in ground area of the shade, i.e., shadows. A location of position A includes no shade feature. A location of position B includes a tree 102 with branches higher than a roof of the vehicle 12 and having a canopy larger than the vehicle 12. A location of position C provides a wall 104 higher than the vehicle 12 is tall. FIGS. 4, 5 and 6 show the vehicle 12 in positions A, B and C, respectively, in more detail.

The vehicle 12 in example position A is oriented to face the sun 106 with the sun 106 at a low angle, e.g., less than 30 degrees, as may occur at sunrise and sunset. Vehicle 12 has its fuel tank 22 disposed beneath a cargo bed 108 of vehicle 12. Cargo bed 108 is disposed behind a cab 110 of vehicle 12. The cargo bed 108 is an example fuel tank area, i.e., a portion of the vehicle 12 covering the fuel tank 22. An exposure to sunlight, i.e., a sun load, on cargo bed 108 may increase a temperature of the fuel inside fuel tank 22. The cargo bed 108 may optionally be covered by a truck bed cover, i.e., a tonneau cover. With vehicle 12 facing the sun 106, light rays 112 from the sun 106 are substantially parallel to the sides of the vehicle. The roof 78 of the cab 110 is higher than the cargo bed 108 by a significant amount, e.g., 40 inches. The difference in height allows the cab 110 to cast a shadow, i.e. a cab shadow 114, across the cargo bed 108 when the sun 106 is at a low angle α, e.g., less than 30 degrees, relative to the horizon. The shadow 114 shields the bed 108 from a direct impact of the light rays 112. The light rays 112 are at an angle parallel to the angle of the sun to the horizon, with the sun being at zero degrees when it is at the horizon and at ninety degrees when it is directly overhead.

When equipped with a tonneau cover, the cover traps air between itself and the cargo bed 108. When light rays 112 strike the tonneau cover, the cargo bed is heated by trapped air. The cargo bed 108 may become even hotter than when exposed directly to the sun, particularly if the tonneau cover is a dark color, e.g., black. Opening the tonneau cover reduces the heating of the cargo bed. Partial opening may provide some shade benefit while allowing the hot air to escape. Tonneau covers may driven by an electric motor, and thus may be remotely or automatically actuated. One example tonneau cover includes a plurality of laterally oriented individually articulated slats. In a closed condition, the slats form a substantially planar surface extending an entire length of the cargo bed 112 at a top of a cargo box framing the cargo bed. In an open condition, the slats are rolled up inside a box behind the cab 110.

The vehicle 12 in example position B is positioned under the tree 102. The canopy of the tree 102 provides a shadow, i.e., a tree shadow 116, entirely shading the vehicle 12 when the sun 106 is at a high angle, e.g., more than 80 degrees. The tree 102, particularly the tree's canopy including its branches and leaves, provides an elevated laterally extending surface that blocks light rays from the sun 106. Such an elevated laterally extending surface may alternatively be provided by man-made structures including a carport and a garage. The vehicle 12 can keep the cargo bed 108 in the shadow 116 when the sun is at an intermediate angle, e.g., between 30 degrees and 80 degrees, by moving forward or backwards relative to the tree. By so moving, the vehicle 12 is able to keep the cargo bed 108 in the tree shadow 116, protected from the sun.

The vehicle 12 in example position B is positioned with its rear bumper proximate to the illustrated example vertically extending wall 104. The wall 104 is a substantially vertical source of shade. The wall 104 blocks the light rays 112 from striking the ground, i.e., the surface on which the vehicle is located, when the sun is at an angle of less than 90 degrees. The light rays 112 are blocked from an increasingly larger area as the angle $\alpha$ decreases. The area of shade where the light rays 112 are blocked, i.e., a wall shadow 118, shade the bed when the sun 106 is in a range of angle $\alpha$ from zero degrees to 60 degrees. A higher wall will provide a greater angular range of protection.

The ECU 72 may be programmed to identify positions of vehicle 12 providing a best available fuel temperature management position and move the vehicle to that position. A method or process 120 for vehicle 12 to identify and move to an optimal position is described below.

Processing

Figure 7A:
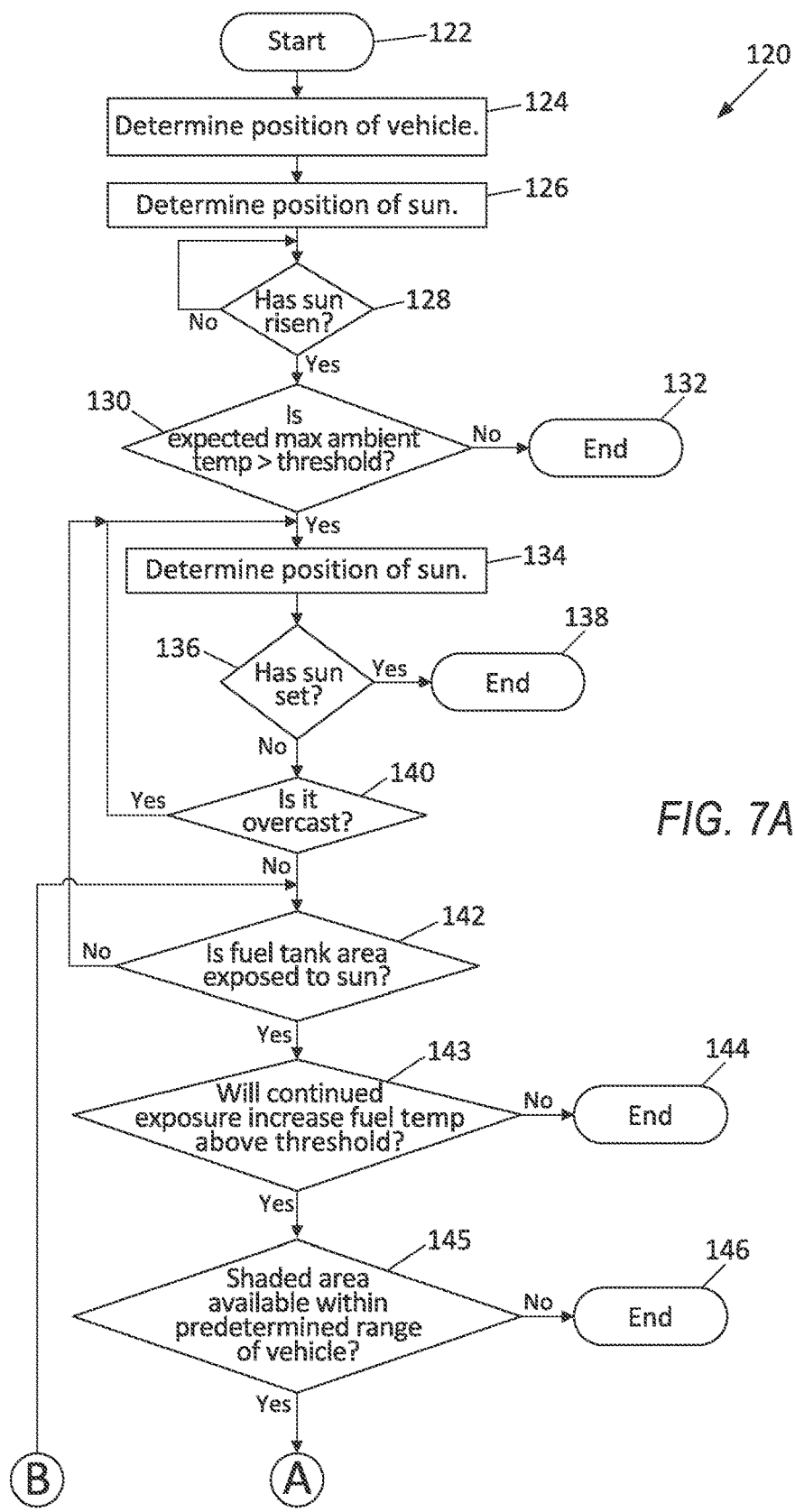
FIGS. 7A and 7B are, collectively, an example flow chart of a process to reposition the vehicle of FIGS. 2-6 relative to an orientation of the sun.
Figure 7B:
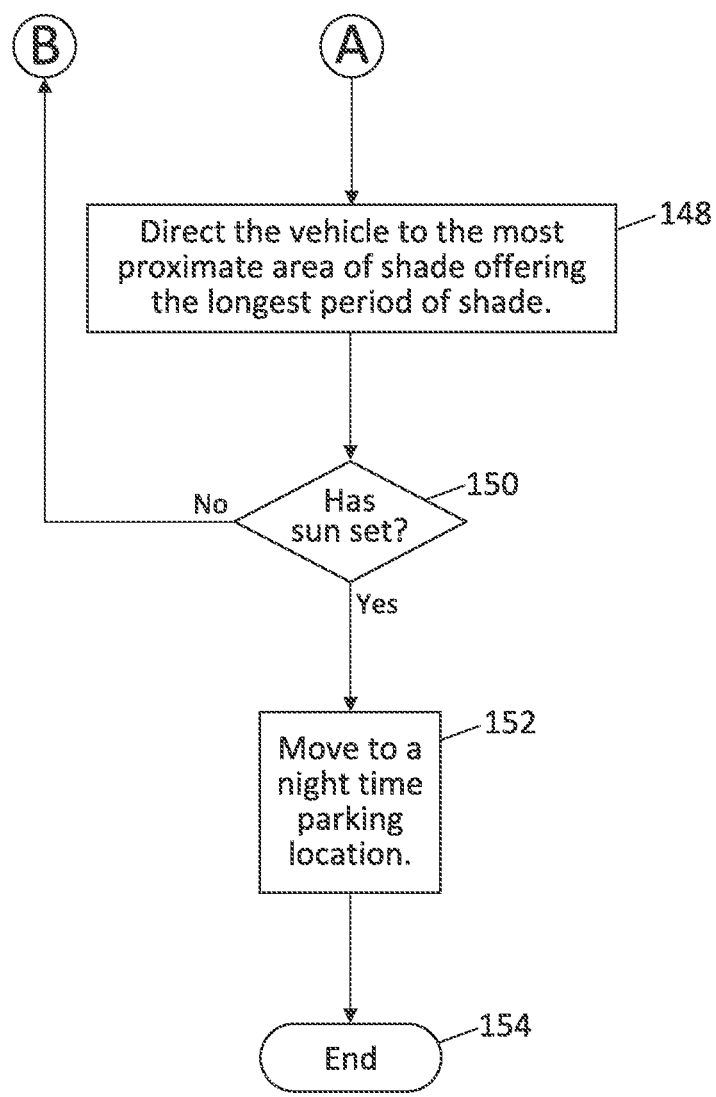

FIGS. 7A and 7B illustrate an example repositioning process 120 that may be included in program instructions stored in ECU 72 of vehicle 12. ECU 72 executes the steps illustrated in FIGS. 7A and 7B as described below, i.e., a description of a block executing an action or step means that the ECU 72 is executing the action or step according to its stored program instructions. A computer program for executing process 120 may be instantiated in start block 122, e.g., when a power-on command is issued, as may be associated with the vehicle 12 being powered up responsive to an approach or a touch by a vehicle passenger.

From start block 122, process 120 moves to process block 124. Process block 124 determines the position of the vehicle. The position includes a geographic location of the vehicle 12 and a directional orientation of the vehicle 12. The geographic location may be determined with a GPS sensor and may be expressed in GPS coordinates. A directional orientation, e.g., north, south, east, west, of the vehicle may be determined by an electronic compass that may be installed in the vehicle 12.

Process 120 next proceeds to process block 126, in which the ECU 72 determines a position of the sun 106 relative to the location of the vehicle 12. The position of the sun 106 may be calculated based on a calendar day, a time of day, and the geographic location of the vehicle 12.

Next, process 120 may move to a decision block 128 to determine whether the sun has risen, i.e., is above the horizon. Such a determination may be made based on calculations made by process block 126 in determining the position of the sun 106. It is known to calculate a time for sunrise and sunset for a known geographic location at a known time. An alternative process may be initiated at the time determined to be a sunrise time, avoiding the need for decision block 128. When decision block 128 determines that the sun 106 has not risen, the logic circles back to decision block 128 to continue checking. When the sun 106 is determined to be above the horizon, process 120 moves on to decision block 130.

Decision block 130 determines whether an expected daily maximum ambient air temperature is predicted to exceed a first threshold temperature, e.g., zero degrees Celsius. The ambient temperature, in combination with the exposure of surfaces proximate to the fuel tank 22, such as the cargo bed 108, to direct sunlight, may raise the fuel 60 to a temperature at which, if sustained, will result in sufficient vapors passing through canister 24 that the charcoal in the canister will be saturated. The capacity of system 16 to capture fumes, i.e., the volatile chemical molecules of the vapor, entering the canister 24 is limited by factors including a volume of charcoal in canister 24. When the capacity of system 16 and canister 24 are exceeded, the vapor and its volatile chemicals pass untreated into the atmosphere.

An increase in the temperature of the fuel may also result in a more rapid saturation of the canister charcoal when the fuel tank 22 is overfilled. Overfilling may occur when the tank is filled beyond the point at which the vacuum valve in a gas pump's fuel nozzle is overridden to add more fuel to the tank. When overfilled, an increase in the temperature of the fuel may cause the fuel to expand to the point where it flows into the canister 24 in liquid form, saturating the charcoal and compromising the operation of the canister 24 and the system 16. The saturated canister 24 will may not be able to properly circulate fuel vapors back to the intake manifold 58. The operation of the evaporative emissions system 16 is thus compromised. Components of the system 16, e.g., the canister 24, may be damaged to the point of needing to be replaced. Such damage to the canister 24 and the system will result in an undesired escape of fuel vapors from the system 16 to the atmosphere.

The maximum expected ambient air temperature information may be obtained through wireless communications with a service network, i.e., a so-called cloud server or other geographically remote data source with which the ECU 72 can communicate via a wide area network possibly including the Internet, cellular, wireless, etc.

When process block 130 determines that the expected daily maximum ambient air temperature will remain below the first threshold temperature, process 120 is directed to end block 132 where process 120 terminates, allowing the vehicle to remain in place in its present position. When process block determines that the temperature will not remain below the threshold temperature, process 120 may move on to process block 134.

Process block 134 determines the position of the sun, the position including a compass direction (north, south, east west) and an angular direction relative to the horizon. Process block 134 may be followed by decision block 136.

Decision block 136 determines whether the sun has set, i.e., dropped below the horizon. The position of the sun 106 may be used to determine whether the sun has set. When it is determined that the sun has set, process 120 moves to end block 138 and terminates. When it is determined that the sun has not set, process moves to decision block 140.

Decision block 140 determines whether the sky is overcast, i.e., cloudy, foggy, and/or smoggy. Such a determination may be made using the data from the autonomous vehicle sensors 74, including camera data. Such data may be analyzed for evidence of distinct shadows. Data may also be obtained from other light-sensitive sensors in the vehicle 12, such as a light sensor used to control an illumination of the headlights of vehicle 12. When decision block 140 determines that the sky is overcast, process 120 returns to process block 134. When decision block 140 determines that the sky is not overcast, process 120 moves on to decision block 142.

Decision block 142 determines when the fuel tank area is exposed, e.g., the cargo bed 108, is exposed to direct sunlight. Vehicle 12 may employ on-board cameras to determine whether the cargo bed 108 is exposed to direct sunlight, i.e., whether there is a line of sight between the cargo bed 108 and the sun. Vehicle 12 may additionally include light sensors disposed over the fuel storage area. Data from such light sensors may be analyzed to determine whether the light impinging thereon is direct sunlight.

When the fuel tank area is not exposed to direct sunlight, the vehicle 12 may remain in place, with vehicle ECU 72 continuing to check for direct sunlight. To execute such a check for sunlight, process may return to process block 134.

When decision block 142 determines that the fuel tank area 108 is exposed to direct sunlight, process 120 moves to decision block 143. Decision block 143 determines whether continued exposure to the light rays from the sun 106 are expected to increase the temperature of the fuel 60 above a fuel temperature threshold at which the charcoal in the canister 24 may become saturated, either by the vapors or by liquid fuel. Such a determination may be based on factors including the position of the sun 106 relative to the fuel tank area for the remainder of the day, the ambient air temperature, the amount of time remaining in the day before sunset, a relationship between the sun load on the vehicle and heat transferred to the fuel as may be established experimentally and maintained in a lookup table, and an initial level of fuel in the vehicle. The factors may be incorporated into a look-up table that may be used to estimate a magnitude of fuel expansion and vapor emissions. Alternatively, the preceding factors may be incorporated into an equation estimating the magnitude of fuel expansion or vapor emissions. The values of fuel estimated fuel expansion and vapor emissions may be used to determine whether and when continued exposure to the light rays 112 of the sun 106 will increase the temperature of the fuel 60 beyond the fuel temperature threshold, i.e., to a value where the fuel 60 exceeds the volume threshold to compromise the performance of the evaporative emissions system 16 is threatened. When the determination is that reaching such a temperature is not likely, process 120 may move to end block 144 and terminate.

When decision block 143 determines that continued exposure to the sun will increase the fuel temperature beyond the threshold and with it the fuel volume and the fuel vapors, process 120 moves to decision block 145 in anticipation of moving the vehicle 12 into a shaded area. Decision block 145 seeks to identify shaded areas available within a predetermined range, e.g., 100 meters, of the vehicle 12. Shaded areas include any area where shade is available, including self-generated shade. When no shaded areas are available, process 120 moves end block 146 and process 120 terminates, with vehicle 12 remaining in place.

When decision block 145 identifies a shaded area, as may be provided by a wall 104, tree 102, or the vehicle 12 itself, process 120 directs the vehicle to a shaded position. When multiple areas of shade are identified within the predetermined range of the vehicle, process 120 may prioritize its selection of shade areas based on a plurality of factors. Such factors may include the size or area of the shade area, and how that area will change during daylight hours, taking into consideration an anticipated movement and characteristics, e.g., the geometric characteristics of the sources of shade of each shade area. The preceding information may be used to select an area of shade that will maximize a period of time for which the vehicle 12 will remain continuously shaded without moving.

Once the vehicle 12 is in the shaded area, the process 120 moves to decision block 150 and checks on whether the sun 106 has set. If the sun has set, process 120 may move to process block 152 which may direct that the vehicle move to a nighttime parking position. With the vehicle 12 thus parked, and any need to reposition to avoid the sun past, and the process 120 moves to end block 154 and terminates. When the sun has not set, process 120 returns to decision block 142 and checks on whether the fuel tank area 108 is exposed to the sun. The checks may be continued until the sun sets, and process 120 terminates at end block 154.

The example process 120 of FIGS. 7A and 7B allows the vehicle 12 to continuously or at least substantially continuously monitor lighting conditions throughout the day and to autonomously reposition itself to protect the fuel tank area from direct sunlight. Alternatively, vehicle 12 could be caused by a message from the vehicle network to power-on or wake up, assess the sun light, and, if necessary reposition itself to move the fuel tank area out of direct sunlight. The wake-ups may be scheduled to occur at regular intervals throughout the day, coinciding with movement of the sun 106 across the sky. Example intervals may be at a time at or near sunrise, at or near noon, and at or near midafternoon. An alternative schedule may have only two wake-ups. The number and timing of such wake-ups may be determined by a setting or parameter provided from the service network.

The example process 120 may be further extended to address a prioritization among vehicles for shade areas when the available shade areas are insufficient to accommodate all vehicles in the area. Prioritization may be based on a likelihood of the vehicle 12 emitting fuel vapors. Vehicles at higher risk of suffering evaporative fuel emissions, e.g., a freshly refueled vehicle, may be granted higher priority to park in a shaded area relative to a vehicle with a fuel tank that is only half full. Vehicles may also be prioritized by the type of fuel they are carrying, with vehicles carrying fuel with the highest vapor pressure getting priority over vehicles carrying fuel with a lower vapor pressure. Vehicles with larger fuel tanks, e.g., trucks, may also be prioritized over vehicles with smaller fuel tanks, e.g., small passenger cars. Further priorities may include vehicle color, with darker vehicles getting more priority. The service network may have all of the priority factors of vehicles in close proximity to each other stored as data and employ a prioritization algorithm to rank all of the vehicles for shade priority. The service network may expressly authorize each vehicle to either reposition or not reposition. When authorized to reposition, the authorized vehicle would be directed to a shade area selected by the service network based on information the network receives from the vehicles. With a plurality of vehicles, smaller vehicles may use larger vehicles as shade sources.

Conclusion

An example system and method for repositioning a vehicle has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device, programmed to:
   determine a position of the sun relative to a vehicle;
   identify areas of shade within a predetermined distance of the vehicle;
   select one of the identified areas of shade as a target area; and
   directing the vehicle to the target area upon determining, based on the relative position of the sun, that a liquid fuel temperature threshold at which the liquid fuel vaporizes will be exceeded.

2. The computing device of claim 1, further programmed to:
   determine that the sky is one of overcast and not overcast, and
   identify the areas of shade within the predetermined range of the vehicle upon determining that the sky is not overcast.

3. The computing device of claim 1, further programmed to:
   determine that the sun has set; and
   direct the vehicle to a nighttime parking position.

4. The computing device of claim 1, further programmed to orient the vehicle toward the sun upon determining that the sun is at a low angle.

5. The computing device of claim 1, further programmed to position the vehicle under a laterally extending elevated surface upon determining that the sun is overhead.

6. The computing device of claim 1, further programmed to direct the vehicle to a position against a substantially vertical source of shade upon determining that light rays from the sun striking a surface on which the vehicle is positioned at an angle less than ninety degrees.

7. The computing device of claim 1, further programmed to determine that the vehicle may remain in place upon determining that an expected maximum ambient temperature does not exceed a threshold temperature.

8. The computing device of claim 1, further programmed to:
   calculate a size of the identified areas of shade as a function of time;
   identify the target area of shade among the identified areas of shade as the area that allows the vehicle to remain continuously shaded without being moved for the longest period of time; and
   direct the vehicle to the target area of shade.

9. The computing device of claim 1, further programmed to position a fuel tank area of the vehicle in the target area.

10. The computing device of claim 9, wherein the fuel tank area is a cargo bed disposed behind a vehicle cab.

11. A method of determining and responding to a sunlight load on a vehicle's fuel tank area, the method comprising the steps of:
    determining a position of a vehicle;
    determining a position of the sun relative to the vehicle;
    identifying areas of shade within a predetermined range of the vehicle;
    selecting one of the identified areas of shade as a target area; and
    directing the vehicle to the target area upon determining, based on the relative position of the sun, that a liquid fuel temperature threshold at which the liquid fuel vaporizes will be exceeded.

12. The method of claim 11, further comprising the steps of:
    determining that the sky is one of overcast and not overcast; and
    identifying the areas of shade within the predetermined range of the vehicle upon determining that the sky is not overcast.

13. The method of claim 11, further comprising the steps of:
    determining that the sun has set; and
    directing the vehicle to a nighttime parking position.

14. The method of claim 11, further comprising the step of orienting the vehicle toward the sun upon determining that the sun is at a low angle.

15. The method of claim 11, further comprising the step of positioning the vehicle under a laterally extending elevated surface upon determining that the sun is overhead.

16. The method of claim 11, further comprising the step of directing the vehicle to a position against a substantially vertical source of shade upon determining that light rays from the sun striking a surface on which the vehicle is positioned is at an angle less than ninety degrees.

17. The method of claim 11, further comprising the step of determining that the vehicle may remain in place upon determining that an expected maximum ambient temperature does not exceed a threshold temperature.

18. The method of claim 11, further comprising the steps of:
    calculating a size of the identified areas of shade as a function of time;
    identifying the target area of shade among the identified areas of shade as the area that allows the vehicle to remain continuously shaded without being moved for the longest period of time; and
    directing the vehicle to the target area of shade.

19. The method of claim 11, further comprising the step of positioning a fuel tank area of the vehicle in the target area.

20. The method of claim 19, wherein the fuel tank area is a cargo bed disposed behind a vehicle cab.

* * * * *